United States Patent
Tao et al.

(10) Patent No.: US 12,521,396 B2
(45) Date of Patent: *Jan. 13, 2026

(54) PHARMACEUTICAL COMPOSITIONS COMPRISING A MENIN INHIBITOR

(71) Applicant: Kura Oncology, Inc., San Diego, CA (US)

(72) Inventors: Jing Tao, San Diego, CA (US); Roger Paul Bakale, San Diego, CA (US); Craig Michael Bowe, San Diego, CA (US); Dipanjan Sengupta, San Diego, CA (US); Patricia Andres, Bend, OR (US); Chaoyi Deng, Pudong New Area Shanghai (CN)

(73) Assignee: Kura Oncology, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/827,538

(22) Filed: Sep. 6, 2024

(65) Prior Publication Data

US 2025/0099469 A1     Mar. 27, 2025

Related U.S. Application Data

(63) Continuation of application No. PCT/CN2024/105761, filed on Jul. 16, 2024.
(Continued)

(30) Foreign Application Priority Data

Jun. 3, 2024 (WO) ................ PCT/CN2024/097083

(51) Int. Cl.
*A61K 31/519* (2006.01)
*A61K 9/20* (2006.01)
(Continued)

(52) U.S. Cl.
CPC .......... *A61K 31/519* (2013.01); *A61K 9/2009* (2013.01); *A61K 9/2013* (2013.01);
(Continued)

(58) Field of Classification Search
CPC .. A61K 31/519; A61K 9/2009; A61K 9/2013; A61K 9/2018; A61K 9/2054; A61K 9/4858; A61K 9/4866; C07D 495/04
See application file for complete search history.

(56) References Cited

U.S. PATENT DOCUMENTS

| | | | | |
|---|---|---|---|---|
| 4,432,987 | A * | 2/1984 | Barth | ...................... A61P 31/04 514/193 |
| 10,077,271 | B2 | 9/2018 | Grembecka et al. | |

(Continued)

FOREIGN PATENT DOCUMENTS

| | | |
|---|---|---|
| WO | WO-2016195776 A1 | 12/2016 |
| WO | WO-2017161028 A1 | 9/2017 |

(Continued)

OTHER PUBLICATIONS

Handbook of Pharmaceutical Excipients, 5th edition 2006, (http://www.gmpua.com/RD/RD/HandbookPharmaceutical%20Excipients.pdf (Year: 2006).*

(Continued)

*Primary Examiner* — James H Alstrum-Acevedo
*Assistant Examiner* — Manahil Mirghani Ali Abdalhameed
(74) *Attorney, Agent, or Firm* — WILSON SONSINI GOODRICH & ROSATI

(57) ABSTRACT

Described herein are crystalline forms of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-

(Continued)

carbonitrile or solvate thereof, methods of making such forms, and pharmaceutical composition comprising such forms.

28 Claims, 3 Drawing Sheets

Related U.S. Application Data

(60) Provisional application No. 63/514,089, filed on Jul. 17, 2023.

(51) Int. Cl.
  *A61K 9/48* (2006.01)
  *C07D 495/04* (2006.01)

(52) U.S. Cl.
  CPC .......... *A61K 9/2018* (2013.01); *A61K 9/2054* (2013.01); *A61K 9/4858* (2013.01); *A61K 9/4866* (2013.01); *C07D 495/04* (2013.01)

(56) References Cited

U.S. PATENT DOCUMENTS

| | | | |
|---|---|---|---|
| 10,174,041 B2 | 1/2019 | Grembecka et al. | |
| 10,781,218 B2 | 9/2020 | Wu et al. | |
| 11,396,517 B1 | 7/2022 | Dai et al. | |
| 11,673,898 B2 | 6/2023 | Wu et al. | |
| 2019/0092784 A1 | 3/2019 | Wu et al. | |
| 2025/0101035 A1 | 3/2025 | Bakale et al. | |

FOREIGN PATENT DOCUMENTS

| | | | | |
|---|---|---|---|---|
| WO | WO-2018106820 A1 | | 6/2018 | |
| WO | WO-2018175746 A1 | | 9/2018 | |
| WO | WO-2022086986 A1 | | 4/2022 | |
| WO | WO-2022241122 A1 | * | 11/2022 | ........... A61K 31/497 |
| WO | WO-2023086419 A1 | * | 5/2023 | ........... A61K 31/497 |
| WO | WO-2023114867 A2 | | 6/2023 | |
| WO | WO-2023150635 A1 | | 8/2023 | |
| WO | WO-2024097758 A1 | | 5/2024 | |
| WO | WO-2025016385 A1 | | 1/2025 | |
| WO | WO-2025019497 A2 | | 1/2025 | |
| WO | WO-2025106862 A1 | | 5/2025 | |
| WO | WO-2025158405 A1 | | 7/2025 | |
| WO | WO-2025165706 A1 | | 8/2025 | |

OTHER PUBLICATIONS

S. Morissette, et al. Advanced Drug Delivery Reviews, vol. 56, Issue 3, 2004, pp. 275-300 (Year: 2004).*
P. Khadka, et. al. (Asian Journal of Pharmaceutical Sciences, vol. 9, Issue 6, 2014, pp. 304-316, https://doi.org/10.1016/j.ajps.2014.05.005 (Year: 2014).*
Agarwal, S.K. et al. Menin Molecular Interactions: Insights into Normal Functions and Tumorigenesis. Hormone and Metabolic Research 37(6):369-374 (2005).
Ansel, Howard C. et al. Pharmaceutical Dosage Forms and Drug Delivery Systems, 7th Edition. Lippincott Williams & Wilkins (1999).
Bernstein, Joel. Crystal Structure Prediction and Polymorphism. ACA Transactions 39:14-23 (2004).
Braga, Dario. et al. Making Crystals from Crystals: a Green Route to Crystal Engineering and Polymorphism. Chemical Communications 29:3635-3645 (2005).
Co-pending U.S. Appl. No. 18/827,512, inventors Bakale; Roger Paul et al., filed Sep. 6, 2024.
Gennaro, Alfonso R. Remington: Practice of The Science and Pharmacy, 19th Edition. Mack Publishing Company (1995).
Hoover, John E. et al. Remington's Pharmaceutical Sciences. Mack Publishing Company 1-5 (1975).
International Conference on Harmonization of Technical Requirements for Registration of Pharmaceuticals for Human Use (ICH), "Impurities: Guidelines for Residual Solvents Q3C(R6)." 1-40 (Oct. 2016).
Jones, William. et al. Pharmaceutical Cocrystals: An Emerging Approach to Physical Property Enhancement. MRS Bulletin 31:875-879 (2006).
Liberman, Herbert A, and Leon Lachman. Pharmaceutical Dosage Forms: Tablets. Marcel Decker 1-7 (1980).
PCT Application No. PCT/CN2024/092390, Inventors Bakale, Roger Paul et al., filed on May 10, 2024.
Price, Sarah L. The Computational Prediction of Pharmaceutical Crystal Structures and Polymorphism. Advanced Drug Delivery Reviews 56:301-319 (2004).
U.S. Appl. No. 63/600,575, inventors Burrows; Francis et al., filed Nov. 17, 2023.
U.S. Appl. No. 63/659,748, inventors Burrows; Francis et al., filed Jun. 13, 2024.
U.S. Appl. No. 63/680,376, inventor Leoni; Mollie, filed Aug. 7, 2024.
Yokoyama, Akihiko. et al. The Menin Tumor Suppressor Protein is an Essential Oncogenic Cofactor for MLL-associated Leukemogenesis. Cell 123(2):207-218 (2005).
Fiskus, Warren, et al. Activity of menin inhibitor ziftomenib (KO-539) as monotherapy or in combinations against AML cells with MLL1 rearrangement or mutant NPM1. Leukemia 36:2729-2733 (2022).
Lei, Hao, et al. Recent Progress of Small Molecule Menin-MLL Interaction Inhibitors as Therapeutic Agents for Acute Leukemia. J. Med. Chem. 64:15519-15533 (2021).
PCT/CN2024/105761 International Search Report and Written Opinion dated Oct. 23, 2024.
Borkin, et al. Pharmacologic Inhibition of the Menin-MLL Interaction Blocks Progression of MLL Leukemia In Vivo. Cancer Cell 4(27):589-602 (2015).
U.S. Appl. No. 18/827,512 Office Action dated Dec. 10, 2024.
Co-pending U.S. Appl. No. 19/009,626, inventors Grembecka; Jolanta et al., filed Jan. 3, 2025.
Co-pending U.S. Appl. No. 19/024,601, inventors Wu; Tao et al., filed Jan. 16, 2025.
Co-pending U.S. Appl. No. 19/126,125, inventors Stephen; Dale et al., filed Apr. 30, 2025.
Co-pending U.S. Appl. No. 19/294,155, inventors Bakale; Roger Paul et al., filed Aug. 7, 2025.

* cited by examiner

PHARMACEUTICAL COMPOSITIONS COMPRISING A MENIN INHIBITOR

CROSS-REFERENCE

This application is a continuation of International PCT Application Number PCT/CN2024/105761 filed Jul. 16, 2024, which claims priority to PCT/CN2024/097083 filed Jun. 3, 2024, which claims the benefit of U.S. Provisional Application Ser. No. 63/514,089 filed Jul. 17, 2023, each of which is incorporated by reference herein in its entirety.

BACKGROUND

The mixed-lineage leukemia (MLL) protein is a histone methyltransferase critical for the epigenetic regulation of gene transcription. Many acute leukemias, including acute myeloblastic leukemia (AML), acute lymphoblastic leukemia (ALL) and mixed-lineage leukemia (MLL), are characterized by the presence of chimeric MLL fusion proteins that result from chromosomal translocations of the MLL gene located at chromosome 11, band q23 (11q23). Chimeric MLL fusion proteins retain approximately 1,400 amino acids of the N-terminus of MLL but are fused with one of approximately 80 partner proteins (e.g., AF4, AF9, ENL, AF10, ELL, AF6, AF1p, GAS7). MLL fusion proteins lack the original histone methyltransferase activity of the C-terminus of MLL and gain the ability to regulate transcription of numerous oncogenes, including HOX and MEIS1, resulting in increased cell proliferation and decreased cell differentiation, ultimately leading to leukemogenesis.

The menin protein, which is encoded by the Multiple Endocrine Neoplasia (MEN) gene, is a ubiquitously expressed nuclear protein that engages in interactions with DNA processing and repair proteins, chromatin modifying proteins and numerous transcription factors (Agarwal, et al., *Horm. Metab. Res.*, 2005, 37(6), 369-374). The association of menin with the N-terminus of MLL fusion proteins is necessary for the observed oncogenic activity of MLL fusion proteins.

This association has been shown to constitutively upregulate the expression of HOX and MEIS1 oncogenes and impairs proliferation and differentiation of hematopoietic cells leading to leukemia development. As menin has been shown to function as a general oncogenic cofactor in MLL-related leukemias, the interaction between menin and MLL fusion proteins and MLL represents a potential chemotherapeutic target.

SUMMARY OF THE INVENTION

In one aspect, described herein is a crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1) or solvate thereof.

In one embodiment of the crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile, the crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1) is Form 1, having at least one of the following properties:

(a) an X-ray powder diffraction (XRPD) pattern substantially similar to the one set forth in FIG. 1;
(b) an XRPD pattern with at least three characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta;
(c) a differential scanning calorimetry (DSC) thermogram substantially similar to the one set forth in FIG. 2;
(d) a DSC thermogram with an endotherm having an onset at about 136° C. and/or a peak at about 149° C.;
(e) a thermogravimetric analysis (TGA) curve substantially similar to the one set forth in FIG. 3; or
(f) combinations thereof.

In another aspect, described herein is a pharmaceutical composition comprising a crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof, and a pharmaceutically acceptable excipient.

In another aspect, described herein is a method for treating a disease or condition in a subject, comprising administering to the subject pharmaceutical composition comprising a therapeutically effective amount of a crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof described herein, wherein the disease or condition comprises a leukemia, acute myelogenous leukemia (AML), acute lymphoblastic leukemia (ALL), hematologic malignancy, myelodysplastic syndrome, myelodysplastic/myeloproliferative neoplasm, solid tumor cancer, prostate cancer, breast cancer, liver cancer, brain tumor, or diabetes.

In some embodiments is a method inhibiting an interaction of menin with one or more of MLL1, MLL2, an MLL fusion protein, and an MLL Partial Tandem Duplication, comprising contacting menin with an effective amount of a crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof described herein.

INCORPORATION BY REFERENCE

All publications, patents, and patent applications mentioned in this specification are herein incorporated by reference to the extent applicable and relevant and to the same extent as if each individual publication, patent, or patent application was specifically and individually indicated to be incorporated by reference.

methyl)-1-(2-(4-(methylsulfonyl)piperazin-1-yl)propyl)-
1H-indole-2-carbonitrile (Compound 1) or solvate thereof,
Form 1.

Figure 3:
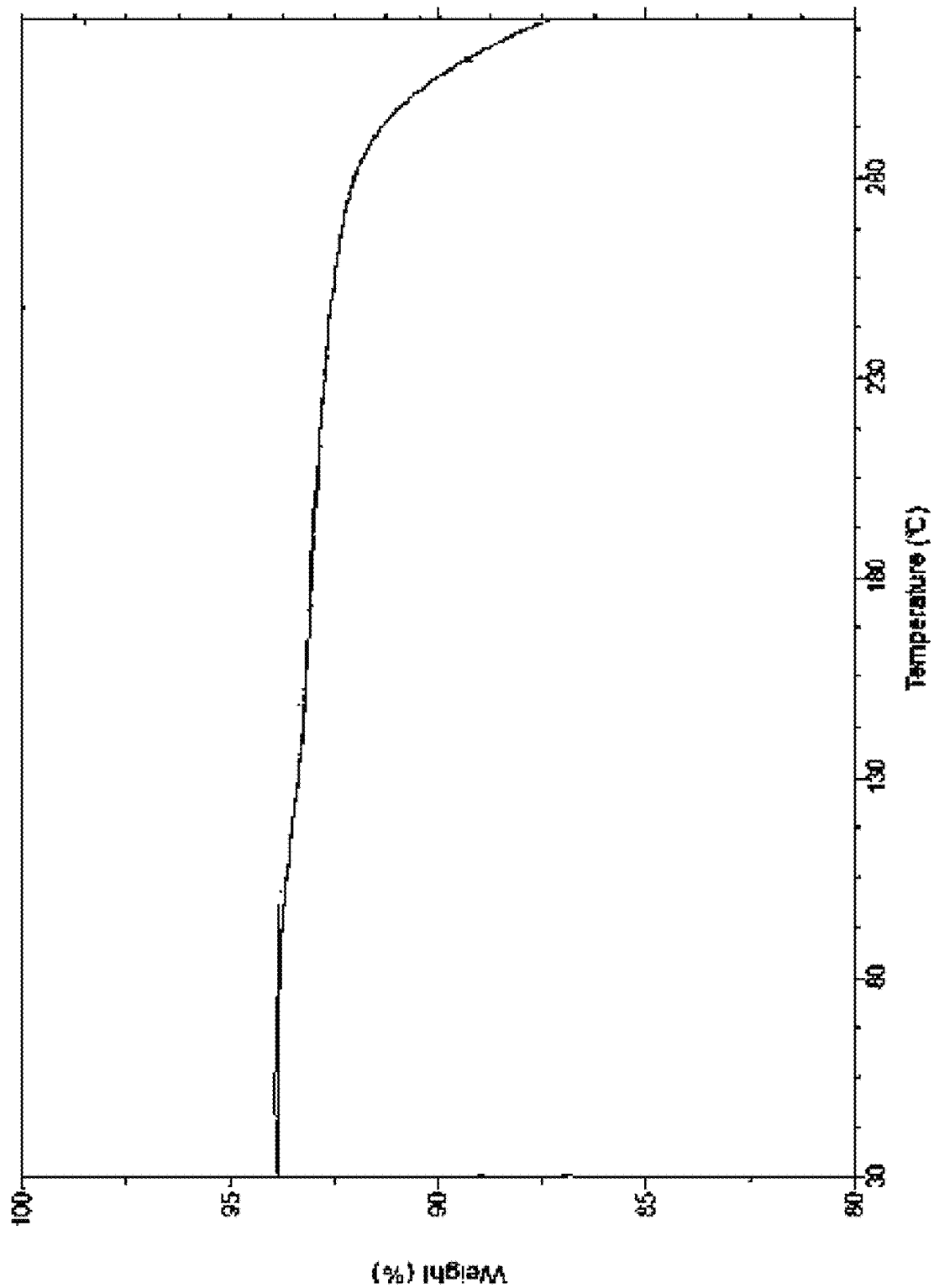

FIG. 3. Illustrates a TGA curve of crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1) or solvate thereof, Form 1.

DETAILED DESCRIPTION OF THE INVENTION

Certain Terminology

Unless defined otherwise, all technical and scientific terms used herein have the same meaning as is commonly understood by one of skill in the art to which the claimed subject matter belongs. It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting. The term "comprising" (and related terms such as "comprise" or "comprises" or "having" or "including") is not intended to exclude that in other certain embodiments, for example, an embodiment of any composition of matter, composition, method, or process, or the like, described herein, may "consist of" or "consist essentially of" the described features. The term "about" when referring to a number or a numerical range means that the number or numerical range referred to is an approximation within experimental variability (or within statistical experimental error), and thus the number or numerical range may vary between 1% and 15% of the stated number or numerical range.

The section headings used herein are for organizational purposes only and are not to be construed as limiting the subject matter described. All documents, or portions of documents, cited in the application including, but not limited to, patents, patent applications, articles, books, manuals, and treatises are hereby expressly incorporated by reference in their entirety.

The term "acceptable" or "pharmaceutically acceptable" with respect to a formulation, composition or ingredient, as used herein, means having no persistent detrimental effect on the general health of the subject being treated or does not abrogate the biological activity or properties of the compound, and is relatively nontoxic.

As used herein, "amelioration" of the symptoms of a particular disease, disorder, or condition by administration of a particular compound or pharmaceutical composition refers to any lessening of severity, delay in onset, slowing of progression, or shortening of duration, whether permanent or temporary, lasting or transient that can be attributed to or associated with administration of the compound or composition.

The term "bulk density" means the mass of a volume unit of solid and the term "tap density" (or "tapped density") means the mass of a volume unit of solid after mechanically tapping a container containing the powder sample, and these can measured according to USP method <616>.

The terms "co-administration" or the like, as used herein, are meant to encompass administration of the selected therapeutic agents to a single patient and are intended to include treatment regimens in which the agents are administered by the same or different route of administration or at the same or different time.

The terms "effective amount" or "therapeutically effective amount," as used herein, refer to a sufficient amount of an agent or a compound being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition including a compound as disclosed herein required to provide a clinically significant decrease in disease symptoms without undue adverse side effects. An appropriate "effective amount" in any individual case may be determined using techniques, such as a dose escalation study. The term "therapeutically effective amount" includes, for example, a prophylactically effective amount. An "effective amount" of a compound disclosed herein is an amount effective to achieve a desired pharmacologic effect or therapeutic improvement without undue adverse side effects. It is understood that "an effect amount" or "a therapeutically effective amount" can vary from subject to subject, due to variation in metabolism of Compound 1, age, weight, general condition of the subject, the condition being treated, the severity of the condition being treated, and the judgment of the prescribing physician. By way of example only, therapeutically effective amounts may be determined by a dose escalation clinical trial.

The terms "enhance" or "enhancing" means to increase or prolong either in potency or duration a desired effect. By way of example, "enhancing" the effect of therapeutic agents refers to the ability to increase or prolong, either in potency or duration, the effect of therapeutic agents on during treatment of a disease, disorder, or condition. An "enhancing-effective amount," as used herein, refers to an amount adequate to enhance the effect of a therapeutic agent in the treatment of a disease, disorder, or condition. When used in a patient, amounts effective for this use will depend on the severity and course of the disease, disorder, or condition, previous therapy, the patient's health status and response to the drugs, and the judgment of the treating physician.

The term "particle size distribution" refers to the percentage of particles of a certain size (or in a certain size range) and can be measured according to USP <786> or by a light diffraction measurement per USP <429>.

The term "prophylactically effective amount," as used herein, refers to that amount of a composition applied to a patient which will relieve to some extent one or more of the symptoms of a disease, condition or disorder being treated. In such prophylactic applications, such amounts may depend on the patient's state of health, weight, and the like. As an example, one can determine such prophylactically effective amounts by a dose escalation clinical trial.

The term "subject" as used herein, refers to an animal which is the object of treatment, observation or experiment. By way of example only, a subject may be, but is not limited to, a mammal including, but not limited to, a human.

As used herein, the term "target activity" refers to a biological activity capable of being modulated by a selective modulator. Certain exemplary target activities include, but are not limited to, binding affinity, signal transduction, enzymatic activity, tumor growth, inflammation or inflammation-related processes, and amelioration of one or more symptoms associated with a disease or condition.

The terms "treat," "treating," or "treatment," as used herein, include alleviating, abating or ameliorating a disease or condition symptoms, preventing additional symptoms, ameliorating or preventing the underlying metabolic causes of symptoms, inhibiting the disease or condition, e.g., arresting the development of the disease or condition, relieving the disease or condition, causing regression of the disease or condition, relieving a condition caused by the disease or condition, or stopping the symptoms of the disease or condition. The terms "treat," "treating," or "treatment," include, but are not limited to, prophylactic and/or therapeutic treatments.

Compound 1

In one embodiment is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1) or solvate thereof. "Compound 1" or "(S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile" refers to the free base compound with the following structure:

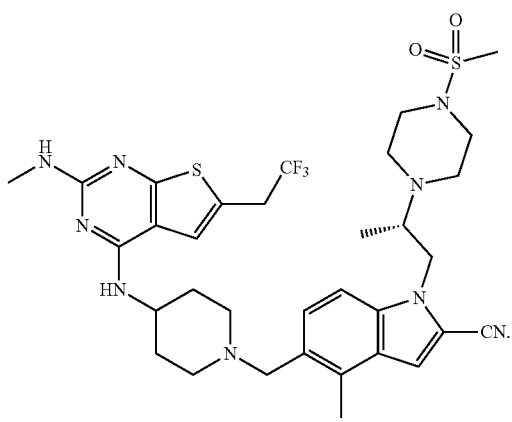

Compound 1 is a menin inhibitor and inhibits the menin-MLL interaction.

In some embodiments, described herein are crystalline forms of Compound 1 or solvates thereof. Solvates contain either stoichiometric or non-stoichiometric amounts of a solvent, and are formed during the process of product formation or isolation with pharmaceutically acceptable solvents such as water, ethanol (EtOH), methanol (MeOH), tert-butyl methyl ether (MTBE), diisopropyl ether, ethyl acetate (EtOAc), isopropyl acetate, isopropyl alcohol (IPA), methyl isobutyl ketone (MIBK), methyl ethyl ketone (MEK), acetone, nitromethane, tetrahydrofuran (THF), dichloromethane (DCM), dioxane, heptanes, toluene, anisole, acetonitrile (ACN), and the like. In some embodiments, solvates are formed using, but not limited to, Class 3 solvent(s). In some embodiments, solvates are formed using, but not limited to, Class 2 solvent(s). Categories of solvents are defined in, for example, the International Conference on Harmonization of Technical Requirements for Registration of Pharmaceuticals for Human Use (ICH), "Impurities: Guidelines for Residual Solvents Q3C(R6)," (October 2016). Hydrates are formed when the solvent is water, or alcoholates are formed when the solvent is an alcohol, such as EtOH or IPA.

In other embodiments, Compound 1 or solvate thereof is prepared in various forms, including but not limited to, an amorphous phase, crystalline forms, milled forms, and nanoparticulate forms. In other embodiments, Compound 1 or solvate thereof is in granule form.

While not intending to be bound by any particular theory, certain solid forms are characterized by physical properties, e.g., stability, solubility, and dissolution rate, appropriate for pharmaceutical and therapeutic dosage forms. Moreover, while not wishing to be bound by any particular theory, certain solid forms are characterized by physical properties (e.g., density, compressibility, hardness, morphology, cleavage, stickiness, solubility, water uptake, electrical properties, thermal behavior, solid-state reactivity, physical stability, and chemical stability) affecting particular processes (e.g., yield, filtration, washing, drying, milling, mixing, tableting, flowability, dissolution, formulation, and lyophilization) which make certain solid forms suitable for the manufacture of a solid dosage form. Such properties can be determined using particular analytical chemical techniques, including solid-state analytical techniques (e.g., X-ray diffraction, microscopy, spectroscopy and thermal analysis), as described herein.

Crystalline Forms

The identification and selection of a solid form of a pharmaceutical compound are complex, given that a change in solid form may affect a variety of physical and chemical properties, which may provide benefits or drawbacks in processing (e.g., flowability, bulk density), formulation, stability, bioavailability, storage, and handling (e.g., shipping), among other important pharmaceutical characteristics. Useful pharmaceutical solids include crystalline solids and amorphous solids, depending on the product and its mode of administration. Amorphous solids are characterized by a lack of long-range structural order, whereas crystalline solids are characterized by structural periodicity. The desired class of pharmaceutical solid depends upon the specific application; amorphous solids are sometimes selected on the basis of, e.g., an enhanced dissolution profile, while crystalline solids may be desirable for properties such as, e.g., physical or chemical stability.

Whether crystalline or amorphous, solid forms of a pharmaceutical compound include single-component and multiple-component solids. Single-component solids consist essentially of the pharmaceutical compound or active ingredient in the absence of other compounds. Variety among single-component crystalline materials may potentially arise from the phenomenon of polymorphism, wherein multiple three-dimensional arrangements exist for a particular pharmaceutical compound.

Notably, it is not possible to predict apriori if crystalline forms of a compound even exist, let alone the physicochemical and biological properties of such materials, or how to successfully prepare them (see, e.g., Braga and Grepioni, *Chem. Commun.* 2005, 29, 3635-3645 ("with respect to crystal engineering, if instructions are not very precise and/or if other external factors affect the process, the result can be unpredictable"); Jones et al., *MRS Bull.* 2006, 31, 875-879 ("At present it is not generally possible to computationally predict the number of observable polymorphs of even the simplest molecules"); Price, *Adv. Drug Deliv. Rev.* 2004, 56(3), 301-319; and Bernstein, *ACA Transactions* 2004, 39, 14-23 ("a great deal still needs to be learned and done before one can state with any degree of confidence the ability to predict a crystal structure, much less polymorphic forms")).

The variety of possible solid forms creates potential diversity in physical and chemical properties for a given pharmaceutical compound. The discovery and selection of solid forms are of great importance in the development of an effective, stable, and marketable pharmaceutical product.

Crystalline Compound 1, Form 1

Figure 1:
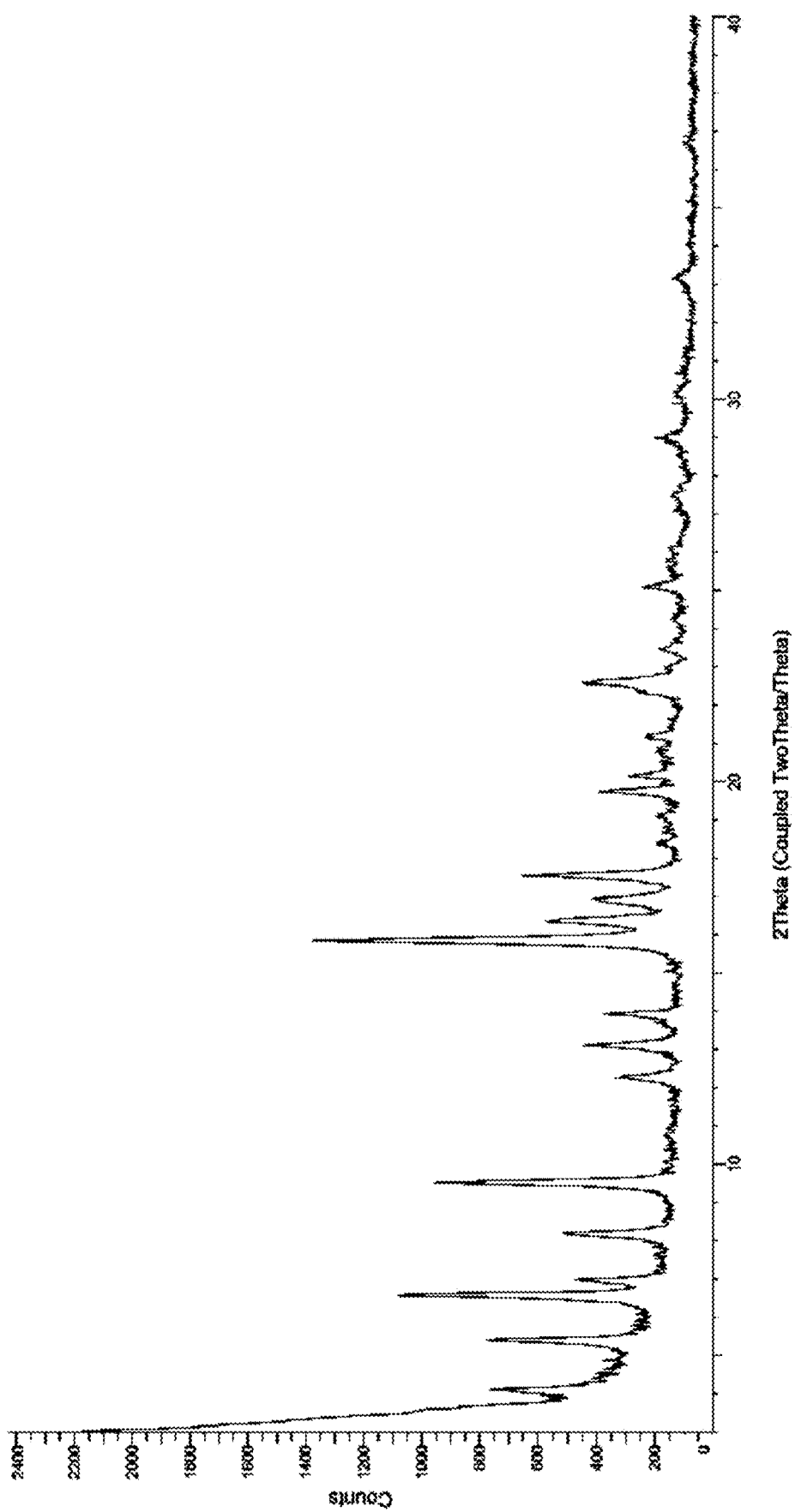
FIG. 1. Illustrates an XRPD pattern of crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1) or solvate thereof, Form 1.
Figure 2:
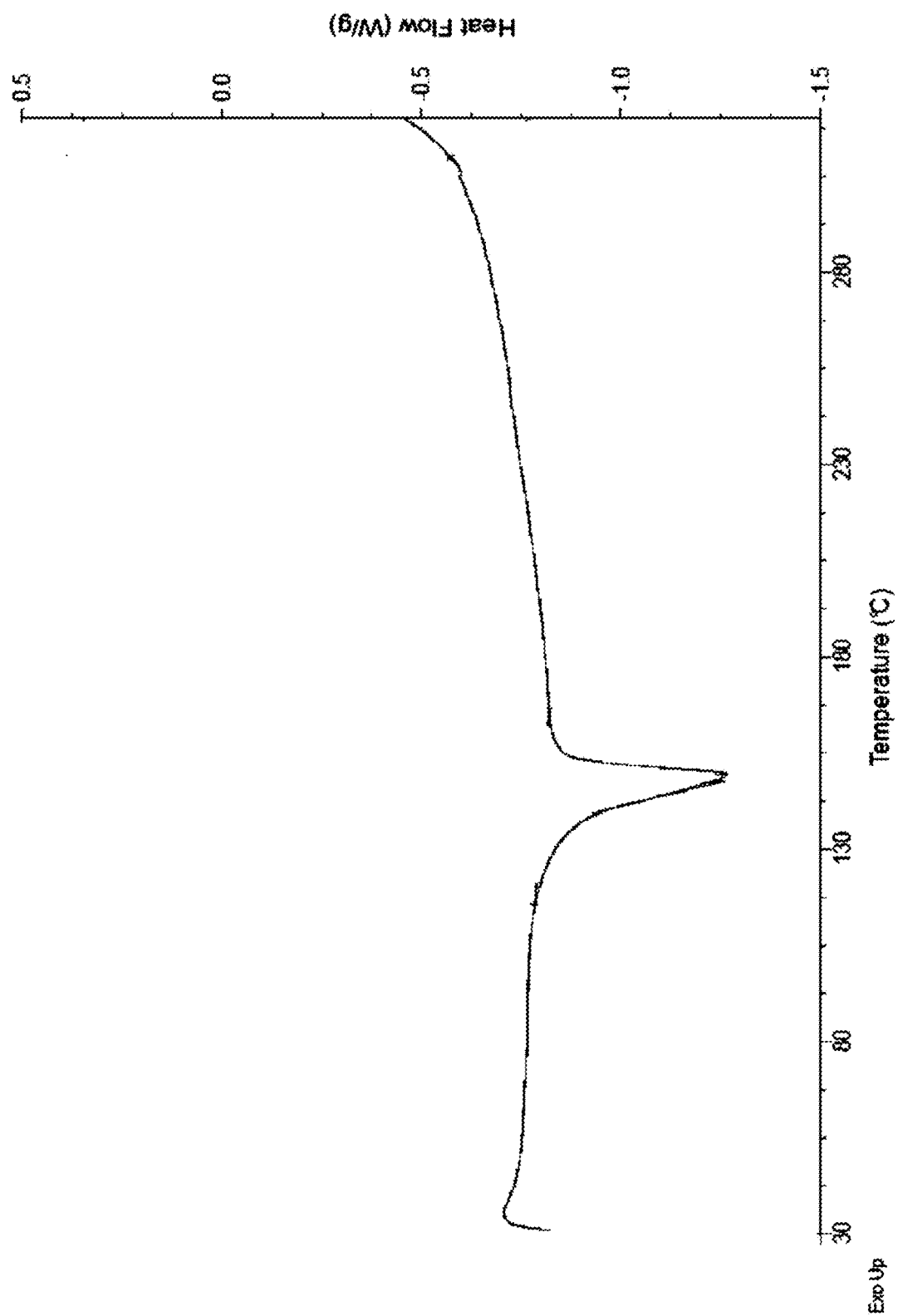
FIG. 2. Illustrates a DSC thermogram of crystalline (S)-4-methyl-5-((4-((2-(methylamino)-6-(2,2,2-trifluoroethyl)thieno[2,3-d]pyrimidin-4-yl)amino)piperidin-1-yl)

In some embodiments, the crystalline form of Compound 1 or solvate thereof is Form 1, characterized as having at least one of the following properties:

(a) an XRPD pattern substantially similar to the one set forth in FIG. 1;
(b) an XRPD pattern with at least three characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta;
(c) a differential scanning calorimetry (DSC) thermogram substantially similar to the one set forth in FIG. 2;
(d) a DSC thermogram with an endotherm having an onset at about 136° C. and/or a peak at about 149° C.;
(e) a TGA curve substantially similar to the one set forth in FIG. 3; or
(f) combinations thereof.

In some embodiments, crystalline Compound 1, Form 1, is characterized as having at least two of the properties selected from (a) to (e). In some embodiments, crystalline Compound 1, Form 1, is characterized as having at least three of the properties selected from (a) to (e). In some embodiments, crystalline Compound 1, Form 1, is characterized as having at least four of the properties selected from (a) to (e). In some embodiments, crystalline Compound 1, Form 1, is characterized as having properties (a) to (e).

In some embodiments, crystalline Compound 1, Form 1, has an XRPD pattern substantially similar to the one set forth in FIG. 1. In some embodiments, crystalline Compound 1, Form 1, has an XRPD pattern with at least four characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with at least five characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with at least six characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with at least seven characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with at least eight, or at least nine, or at least 10, or at least 11, or at least 12, characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with characteristic peaks at 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta. In some embodiments, crystalline Compound 1, Form 1, has an XRPD pattern with characteristic peaks at 5.4° 2-Theta, 6.6° 2-Theta, 8.2° 2-Theta, 9.5° 2-Theta, 15.9° 2-Theta, 16.4° 2-Theta, 17.5° 2-Theta, and 22.6° 2-Theta. In some embodiments, crystalline Compound 1, Form 1, has a DSC thermogram substantially similar to the one set forth in FIG. 2. In some embodiments, crystalline Compound 1, Form 1, has a DSC thermogram with an endotherm having an onset at about 136° C. In some embodiments, crystalline Compound 1, Form 1, has a DSC thermogram with an endotherm having a peak at about 149° C. In some embodiments, crystalline Compound 1, Form 1, has a TGA curve substantially similar to the one set forth in FIG. 3. In some embodiments, crystalline Compound 1, Form 1, has a TGA curve that exhibits a weight loss of about 0.60% over the range of about 29° C. to about 150° C. In some embodiments, crystalline Compound 1, Form 1, is an anhydrate. In some embodiments, crystalline Compound 1, Form 1, is obtained from MEK and IPA. In some embodiments crystalline Compound 1, Form 1, is obtained from a 1:1 mixture of MEK and IPA. In some embodiments, crystalline Compound 1, Form 1, is obtained from toluene. In some embodiments, crystalline Compound 1, Form 1, is obtained from MTBE.

Preparation of Crystalline Compound 1

In some embodiments, crystalline forms of Compound 1 or solvate thereof are prepared as outlined in the Examples. It is noted that solvents, temperatures and other reaction conditions presented herein may vary.

In another embodiment, crystalline Compound 1, Form 1, is substantially pure. In certain embodiments, the substantially pure crystalline Compound 1, Form 1, is substantially free of other solid forms, e.g., amorphous solid. In certain embodiments, the purity of the substantially pure crystalline Compound 1, Form 1, is no less than about 95%, no less than about 96%, no less than about 97%, no less than about 98%, no less than about 98.5%, no less than about 99%, no less than about 99.5%, or no less than about 99.8%.

In some embodiments, crystalline Compound 1, Form 1, is obtained from MEK and IPA with wet milling during the crystallization process. In some embodiments, Compound 1, Form 1, has a bulk density of at least 0.1 g/cm$^3$, or from about 0.1 to about 0.15 g/cm$^3$, or about 0.11, 0.12, 0.13, 0.14, or 0.15 g/cm$^3$. In some aspects, the crystalline Compound 1, Form 1, has a particle size distribution (as measured by a light diffraction method developed per USP <429>) of: $D_{10}$, 1.5 to 4.5 µm, or about 2.0 to 4.0 µm, or about 3.8 to 3.9 µm; $D_{50}$, 5 to 11 µm, or about or about 9.5 to 10.5 µm; or $D_{90}$, 13 to 50 µm, or about 33 to 45 µm. In some aspects, the particle size distribution $D_{90}$ equal to or below 50 µm.

In some embodiments is a method of preparing a crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile comprising heating (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile in a mixture of MEK and IPA to a first temperature of about 35 to 45° C. (optionally wherein the first temperature is about 40° C.) to form a diluted suspension, optionally maintaining the diluted suspension at the first temperature for 3 to 48 h, wet milling the diluted suspension at the first temperature, optionally performing a second wet milling on the diluted suspension at about 25° C., and filtering the diluted suspension to provide the crystalline form. In some embodiments, the method comprises dissolving (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile with the MEK to form a solution, heating the solution to the first temperature, and adding the IPA to form the diluted suspension, optionally wherein the MEK/IPA v/v ratio is from about 2:3 to about 1:10, or from about 1:2 to about 1:8, or is about 1:2, 2:5, or 1:7, or is about 1:7.

Suitable Solvents

Therapeutic agents that are administrable to mammals, such as humans, must be prepared by following regulatory guidelines. Such government regulated guidelines are referred to as Good Manufacturing Practice (GMP). GMP guidelines outline acceptable contamination levels of active therapeutic agents, such as, for example, the amount of residual solvent in the final product. In some embodiments, solvents disclosed herein are those that are suitable for use in GMP facilities and consistent with industrial safety concerns. Categories of solvents are defined in, for example, the International Conference on Harmonization of Technical Requirements for Registration of Pharmaceuticals for Human Use (ICH), "Impurities: Guidelines for Residual Solvents Q3C(R6)," (October 2016).

Solvents are categorized into three classes. Class 1 solvents are toxic and are to be avoided. Class 2 solvents are solvents to be limited in use during the manufacture of the therapeutic agent. Class 3 solvents are solvents with low toxic potential and of lower risk to human health. Data for Class 3 solvents indicate that they are less toxic in acute or short-term studies and negative in genotoxicity studies.

Class 1 solvents, which are to be avoided, include: benzene; carbon tetrachloride; 1,2-dichloroethane; 1,1-dichloroethene; and 1,1,1-trichloroethane.

Examples of Class 2 solvents are: ACN, chlorobenzene, chloroform, cumene, cyclohexane, 1,2-dichloroethene, DCM, 1,2-dimethoxyethane, N,N-dimethylacetamide (DMA), N,N-dimethylformamide, 1,4-dioxane, 2-ethoxyethanol, ethylene glycol, formamide, hexane, MeOH, 2-methoxyethanol, methylbutyl ketone, methylcyclohexane, MIBK, N-methylpyrrolidone, nitromethane, pyridine, sulfolane, THF, tetralin, toluene, 1,1,2-trichloroethene and xylene.

Class 3 solvents, which possess low toxicity, include: acetic acid, acetone, anisole, 1-butanol, 2-butanol, butyl acetate, MTBE, dimethylsulfoxide (DMSO), EtOH, EtOAc, diethyl ether, ethyl formate, formic acid, heptane, isobutyl acetate, isopropyl acetate, methyl acetate, 3-methyl-1-butanol, MEK, 2-methyl-1-propanol, pentane, 1-pentanol, 1-propanol, IPA, propyl acetate, and triethylamine.

Residual solvents in active pharmaceutical ingredients (APIs) originate from the manufacture of APIs. In some cases, the solvents are not completely removed by practical manufacturing techniques. Appropriate selection of the solvent for the synthesis of APIs may enhance the yield, or determine characteristics such as crystal form, purity, and solubility. Therefore, the solvent is a critical parameter in the synthetic process.

In some embodiments, compositions comprising a crystalline form of Compound 1 or solvate thereof comprise an organic solvent(s). In some embodiments, compositions comprising a crystalline form of Compound 1 or solvate thereof comprise a residual amount of an organic solvent(s). In some embodiments, compositions comprising a crystalline form of Compound 1 or solvate thereof comprise a residual amount of a Class 3 solvent. In some embodiments, the organic solvent is a Class 3 solvent, for example a Class 3 solvent listed above. In some embodiments, the Class 3 solvent is selected from the group consisting of acetone, EtOAc, isopropyl acetate, MTBE, heptane, IPA, and EtOH. In some embodiments, the organic solvent is a Class 2 solvent, for example a Class 2 solvent listed above. In some embodiments, the Class 2 solvent is ACN, THF, or toluene. In some embodiments, the Class 2 solvent is ACN. In some embodiments, the organic solvent is 2-butanone or 2-methyltetrahydrofuran (2-MeTHF).

Pharmaceutical Compositions/Formulations

Pharmaceutical compositions comprising Compound 1 or solvate thereof as described herein, such as Form 1, may be formulated in a conventional manner, for example, by means of conventional mixing, dissolving, granulating, drageemaking, levigating, emulsifying, encapsulating, entrapping or compression processes, using one or more physiologically acceptable carriers including excipients and auxiliaries that facilitate processing of the active compounds into preparations which can be used pharmaceutically. Proper formulation is dependent upon the route of administration chosen. A summary of pharmaceutical compositions described herein may be found, for example, in *Remington: The Science and Practice of Pharmacy*, Nineteenth Ed (Easton, Pa.: Mack Publishing Company, 1995); Hoover, John E., *Remington's Pharmaceutical Sciences*, Mack Publishing Co., Easton, Pennsylvania 1975; Liberman, H. A. and Lachman, L., Eds., *Pharmaceutical Dosage Forms*, Marcel Decker, New York, N.Y., 1980; and *Pharmaceutical Dosage Forms and Drug Delivery Systems*, Seventh Ed. (Lippincott Williams & Wilkins 1999), herein incorporated by reference in their entirety.

In one aspect, described herein is a pharmaceutical composition comprising (S)-4-methyl-5-((4-((2-(methylamino)-6-(2,2,2-trifluoroethyl)thieno[2,3-d]pyrimidin-4-yl)amino) piperidin-1-yl)methyl)-1-(2-(4-(methylsulfonyl)piperazin-1-yl)propyl)-1H-indole-2-carbonitrile (Compound 1) or solvate thereof, and a pharmaceutically acceptable excipient. Pharmaceutically acceptable excipients may include, for example, diluents, fillers, binders, disintegrants, glidants, lubricants, carriers, stabilizers, dispersing agents, suspending agents, surfactants, and thickening agents, as well as capsule shells or tablet coatings. The pharmaceutical composition facilitates administration of the compound to a mammal. The compounds can be used singly or in combination with one or more therapeutic agents as components of mixtures.

In some embodiments, the pharmaceutical composition comprises a crystalline form of Compound 1 or solvate thereof, and a pharmaceutically acceptable excipient. In some embodiments, the pharmaceutical composition comprises crystalline Compound 1, Form 1, and a pharmaceutically acceptable excipient. In some embodiments, the pharmaceutical composition comprises Compound 1, Form 1, that has a bulk density of at least 0.1 g/cm$^3$, or from about 0.1 to about 0.15 g/cm$^3$, or about 0.11, 0.12, 0.13, 0.14, or 0.15 g/cm$^3$, and/or a particle size distribution (e.g., as measured by a light diffraction method developed per USP <429>) of: $D_{10}$, 1.5 to 4.5 μm, or about 2.0 to 4.0 μm, or about 3.8 to 3.9 μm; $D_{50}$, 5 to 11 μm, or about or about 9.5 to 10.5 µm; or $D_{90}$, 13 to 50 µm, or about 33 to 45 µm. In some aspects, the particle size distribution $D_{90}$ equal to or below 50 µm.

In some embodiments, the pharmaceutical composition is an immediate release pharmaceutical composition. In some embodiments, the pharmaceutical composition is a solid dosage form. In some embodiments, the pharmaceutical composition comprises from 15 to 800 mg, or 25 mg, 50 mg, 100 mg, 200 mg, 300 mg, 400 mg, 500 mg, 600 mg, 700 mg, or 800 mg of Compound 1 or solvate thereof. In some embodiments, the pharmaceutical composition is a capsule dosage form or a tablet dosage form. In some embodiments, the pharmaceutical composition is a capsule dosage form. In some embodiments, the pharmaceutical composition is a tablet dosage form.

Capsule Formulations

In some embodiments, the capsule dosage form comprises 25 mg, 50 mg, 100 mg, 200 mg, 300 mg, or 400 mg of Compound 1 or solvate thereof. In some embodiments, the capsule dosage form comprises 25 mg, 50 mg, or 200 mg of Compound 1 or solvate thereof. In some embodiments, the capsule dosage form comprises a granule composition comprising Compound 1 or solvate thereof, or a crystalline form of Compound 1 or solvate thereof, in a capsule shell, such as a hydroxypropyl methylcellulose (HPMC) capsule shell. In some embodiments, the granule composition comprises Compound 1 or solvate thereof and a pharmaceutically acceptable excipient. In some embodiments, the granule composition comprises a filler, a disintegrant, a surfactant, or a lubricant, or a combination thereof. In some embodiments, the granule composition comprises two fillers, optionally wherein the fillers comprise mannitol and/or microcrystalline cellulose. In some embodiments, the disintegrant is croscarmellose sodium. In some embodiments, the surfactant is sodium lauryl sulfate. In some embodiments, the lubricant is magnesium stearate. In some embodiments, the pharmaceutically acceptable excipient is selected from mannitol, microcrystalline cellulose, croscarmellose sodium, sodium lauryl sulfate, magnesium stearate, and combinations thereof. In some embodiments, the granule composition comprises Compound 1 or solvate thereof, mannitol, microcrystalline cellulose, croscarmellose sodium, sodium lauryl sulfate, and magnesium stearate. In some embodiments, the granule composition comprises a crystalline form of Compound 1 or solvate thereof. In some embodiments, the granule composition comprises crystalline Compound 1, Form 1. In some embodiments, the quantitative composition for the capsule dosage form comprises Compound 1, such as Compound 1, Form 1, and one or more the following excipients in the relative amounts listed in Table 1.

TABLE 1

| Component | Amount |
|---|---|
| Compound 1 (mg) | 15.0 mg to 800 mg |
| Mannitol (% w/w) (filler) | 15 to 75 |
| Microcrystalline Cellulose (% w/w) (filler) | 10 to 35 |
| Croscarmellose Sodium (% w/w) (disintegrant) | 1 to 10 |
| Sodium Lauryl Sulfate (% w/w) (surfactant) | 0.1 to 1 |
| Magnesium Stearate (% w/w) (lubricant) | 0.1 to 1 |
| Total | 100.0% |

In some embodiments, the granule composition comprises each of these ingredients in the % w/w ranges listed. In some embodiments, the granule composition comprises granules comprising 25 mg, 50 mg, or 200 mg of Compound 1 or solvate thereof, one or more fillers (e.g., mannitol and/or microcrystalline cellulose (about 35 to 85% w/w, or about 45 to 85% w/w, or about 47% w/w, or about 58% w/w), a disintegrant (e.g., croscarmellose sodium) (about 1 to 10% w/w, or about 3 to 10% w/w, or about 4 to 8% w/w, or about 6% w/w), a surfactant (e.g., sodium lauryl sulfate) (about 0.1 to 1.0% w/w, or about 0.2 to 0.8% w/w, or about 0.4 to 0.6% w/w, or about 0.5% w/w), and a lubricant (e.g., magnesium stearate) (about 0.1 to 1.0% w/w, or about 0.2 to 0.8% w/w, or about 0.4 to 0.6% w/w, or about 0.5% w/w). In some embodiments, the granule composition comprises granules comprising 25 mg, 50 mg, or 200 mg of Compound 1 or solvate thereof, mannitol (about 15 to 75% w/w, or about 25 to 35% w/w, or about 25 to 30% w/w, or about 28 to 32% w/w, or about 29% w/w), microcrystalline cellulose (about 10 to 35% w/w, or about 25 to 35% w/w, or about 25 to 30% w/w, or about 28 to 32% w/w, or about 29% w/w), croscarmellose sodium (about 1 to 10% w/w, or about 3 to 10% w/w, or about 4 to 8% w/w, or about 6% w/w), sodium lauryl sulfate (about 0.1 to 1.0% w/w, or about 0.2 to 0.8% w/w, or about 0.4 to 0.6% w/w, or about 0.5% w/w), and magnesium stearate (about 0.1 to 1.0% w/w, or about 0.2 to 0.8% w/w, or about 0.4 to 0.6% w/w, or about 0.5% w/w). In some embodiments, the capsule composition comprises the granules and additional extragranular filler (e.g., mannitol). In some embodiments, the capsule composition comprises the granules and extragranular lubricant.

In some embodiments, the granule composition comprises one of the following three exemplary lists of ingredients in the relative amounts listed in Table 2.

TABLE 2

| Component | #1% w/w | #2% w/w | #3% w/w |
|---|---|---|---|
| Compound 1 | 15.75 (e.g., 25.0 mg) | 35.0 (e.g., 50.0 mg) | 35.0 (e.g., 200.0 mg) |
| Mannitol (filler)* | 68.05 | 29.0 | 29.0 |
| Microcrystalline Cellulose (filler) | 13.05 | 29.0 | 29.0 |
| Croscarmellose Sodium (disintegrant) | 2.70 | 6.0 | 6.0 |
| Sodium Lauryl Sulfate (surfactant) | 0.225 | 0.5 | 0.5 |
| Magnesium Stearate (lubricant)* | 0.225 | 0.5 | 0.5 |
| Total | 100.0 | 100.0 | 100.0 |

*Optionally, granules comprise the listed ingredients in the amounts shown, with the exception of mannitol or magnesium stearate, for which half is included in the granules and half is extragranular.

Tablet Formulations

In some embodiments, the pharmaceutical composition is a tablet dosage form comprising about 25 to 800 mg, or about 100 mg, or about 200 mg, or about 300 mg, or about 400 mg, or about 500 mg, or about 600 mg of Compound 1 or solvate thereof. In some embodiments, the tablet dosage form comprises a pharmaceutically acceptable excipient selected from a filler, a disintegrant, a surfactant, glidant, or a lubricant, or a combination thereof. In some embodiments, the tablet comprises a filler, optionally wherein the filler is selected from microcrystalline cellulose, lactose (e.g., lactose anhydrous), mannitol, and combinations thereof, or is microcrystalline cellulose and either lactose (e.g., lactose anhydrous) or mannitol. In some embodiments, the tablet comprises a disintegrant, optionally wherein the disintegrant is croscarmellose sodium or crospovidone. In some embodiments, the tablet comprises a binder, optionally wherein the binder is hydroxypropylcellulose. In some embodiments, the tablet comprises a surfactant, optionally wherein the surfactant is sodium lauryl sulfate. In some embodiments, the tablet comprises a glidant, optionally wherein the glidant is colloidal silicon dioxide. In some embodiments, the tablet comprises a lubricant, optionally wherein the lubricant is magnesium stearate. In some embodiments, the tablet comprises microcrystalline cellulose, lactose (e.g., lactose anhydrous), hydroxypropylcellulose, croscarmellose sodium, sodium lauryl sulfate, colloidal silicon dioxide, or magnesium stearate, or any combination thereof. In some embodiments, the tablet dosage form comprises microcrystalline cellulose, lactose (e.g., lactose anhydrous), hydroxypropylcellulose, croscarmellose sodium, sodium lauryl sulfate, colloidal silicon dioxide, and magnesium stearate. In some embodiments, the tablet is prepared from granules (intragranular portion) and an extragranular portion. In some embodiments, the tablet dosage for is coated with a non-functional polyvinyl alcohol-based coating (e.g., Opadry II, such as Opadry II orange or beige). In some embodiments, the quantitative composition for the tablet dosage form comprises Compound 1, such as Compound 1, Form 1, and one or more the following excipients in the % w/w ranges listed in Table 3.

TABLE 3

| Component | % w/w |
| --- | --- |
| Compound 1 | 35 to 75 |
| Filler | 10 to 70 |
| (e.g., Microcrystalline cellulose) | 7 to 40 |
| (e.g., Lactose anhydrous or Mannitol) | 5 to 25 |
| Binder | 2 to 10 |
| (e.g., Hydroxypropylcellulose) | 2 to 10 |
| Disintegrant | 1 to 10 |
| (e.g., Croscarmellose sodium or Crospovidone) | 1 to 10 |
| Surfactant | 0.3 to 2 |
| (e.g., Sodium lauryl sulfate) | 0.3 to 2 |
| Lubricant | 0.3 to 2 |
| (e.g., Magnesium stearate) | 0.3 to 2 |
| Glidant | 0.1 to 1 |
| (e.g., Colloidal silicon dioxide) | 0.1 to 1 |
| Total (before coating) | 100.0 |

Compound 1 tablet content may range from about 25 to 800 mg, or about 50 to 500 mg, or about 50 to 200 mg, or about 200 to 500 mg, or may be about 50 mg, 100 mg, 150 mg, 200 mg, 300 mg, 400 mg, 500 mg, or 600 mg. Compound 1 may be used in a % w/w range of about 35 to 75, or about 45 to 55, or about 60 to 75, or may be about 50 or about 67% w/w. Compound 1 may be used in a crystalline form. Compound 1 may be used as Form 1 or an amorphous form of the free base. Compound 1 may be used as free base Form 1 as described herein.

One or more fillers may be used in a total % w/w range of about 10 to 70, or about 17 to 45, or about 17 to 25, or about 35 to 40, or at about 19, or about 22, or about 23, or about 37.5, or about 38.5% w/w. A filler such as microcrystalline cellulose may be used in a % w/w range of about 7 to 40, or about 20 to 30, or about 8 to 15, or about 25 to 30, or at about 9, or about 12, or about 13, or about 29% w/w, or about 30% w/w. A filler such as lactose (e.g. lactose anhydrous) or mannitol, preferably lactose anhydrous, may be used in a % w/w range of about 5 to 25, or 5 to 20, or 7 to 18, or 5 to 10, or at about 8.5, or about 9.5, or about 10% w/w.

A binder such as hydroxypropyl cellulose may be used in a % w/w range of about 2 to 10, or about 3 to 7, or about 4 to 5, or at about 3%, or about 4%, or about 5% w/w.

An intragranular disintegrant such as croscarmellose sodium or crospovidone, preferably croscarmellose sodium, may be used in a % w/w range of about 1 to 6, or about 2 to 4, or at about 2%, or about 3% w/w.

A surfactant such as sodium lauryl sulfate may be used in a % w/w range of about 0.3 to 2, or at about 1% w/w.

An extragranular disintegrant such as croscarmellose sodium or crospovidone, preferably croscarmellose sodium, may be used in a % w/w range of about 1 to 4, or about 1 to 3, or at about 2% w/w.

A lubricant such as magnesium stearate may be used in a % w/w range of about 0.3 to about 2, or about 0.5 to 1.5, or at about 0.75 or about 1% w/w. Optionally the lubricant can be in the extragranular portion.

A glidant such as colloidal silicon dioxide may be used in a % w/w range of about 0.1 to 1, or at about 0.5% w/w.

In some embodiments, the tablet dosage form comprises the following ingredients in the amounts listed in Tables 4 and 6-12.

TABLE 4

| Component | mg/Tablet | % w/w |
| --- | --- | --- |
| Compound 1 | 400 | 50.0 |
| Filler | 300 | 37.5 |
| Microcrystalline cellulose | 232 | 29.0 |
| Lactose anhydrous | 68 | 8.5 |
| Binder | 40 | 5.0 |
| Hydroxypropylcellulose | 40 | 5.0 |
| Disintegrant | 40 | 5.0 |
| Croscarmellose sodium | 40 | 5.0 |
| Surfactant | 8 | 1.0 |
| Sodium lauryl sulfate | 8 | 1.0 |
| Lubricant | 8 | 1.0 |
| Magnesium stearate | 8 | 1.0 |
| Glidant | 4 | 0.5 |
| Colloidal silicon dioxide | 4 | 0.5 |
| Total (before coating) | 800 | 100.0 |
| Coating: Opadry II orange | 24 | 3 |

Abbreviations: % w/w = percent weight/weight.

Methods

In some embodiments is a method of treating a disease or condition in a subject, wherein the disease or condition comprises a leukemia, acute myelogenous leukemia, acute lymphoblastic leukemia, hematologic malignancy, myelodysplastic syndrome, myelodysplastic/myeloproliferative neoplasm, solid tumor cancer, prostate cancer, breast cancer, liver cancer, brain tumor, or diabetes, comprising administering to the subject a crystalline form of Compound 1 or solvate thereof described herein, or a pharmaceutical composition comprising Compound 1 or solvate thereof, or comprising a crystalline form of Compound 1 or solvate thereof, such as a therapeutically effective amount of such compound or pharmaceutical composition as described herein. In practicing the methods of treatment or use provided herein, a therapeutically effective amount of Compound 1 or solvate thereof is administered, for example in a pharmaceutical composition, to a mammal having a disease, disorder, or condition to be treated. In some embodiments, the mammal is a human. A therapeutically effective amount can vary widely depending on the severity of the disease, the age and relative health of the subject, the potency of the compound used and other factors. In some embodiments is a method for treating a leukemia, optionally wherein the leukemia is AML or ALL, comprising administering to the subject in need thereof a therapeutically effective amount of a crystalline form of Compound 1 or solvent thereof described herein. In some embodiments, the AML is menin-dependent AML, KMT2A-rearranged AML, or NPM1-mutant AML. In some embodiments, the ALL is KTM2A-rearranged ALL.

In some embodiments, the method of treating comprises administering to the subject a pharmaceutical composition comprising Compound 1 or solvate thereof, or a crystalline form of Compound 1 or solvate thereof. In some embodiments, the therapeutically effective amount of the pharmaceutical composition is administered in one or more unit dosage forms, at one or more times per day. In some embodiments, the therapeutically effective amount of Compound 1 or solvate thereof is 50 mg, 100 mg, 200 mg, 300 mg, 400 mg, 500 mg, 600 mg, 700 mg, or 800 mg. In some embodiments the therapeutically effective amount is administered once per day. In some embodiments, the therapeutically effective amount is 600 mg, once per day, and can be administered, for example, using three 200 mg tablets or capsules, or two 300 mg tablets or capsules. In some embodiments, the therapeutically effective amount is 400 mg, once per day, and can be administered, for example, using two 200 mg tablets or capsules, or one 400 mg tablet or capsule.

EXAMPLES

I. Characterization of Polymorphs

Example 1: X-Ray Powder Diffraction (XRPD)

X-ray powder diffraction studies were performed using a Bruker D8 Advance with the following instrument parameters: X-Ray wavelength: Cu: K-Alpha (1=1.54179); X-Ray tube setting: Voltage: 40 kV; Current 40 mA Scan scope: 4° (2θ) to 400 (2θ); Sample rotation speed: 15 rpm; Scanning rate: 10 deg/min.

XRPD analysis of Form 1 of Compound 1 (FIG. 1) showed Form 1 to be crystalline with characteristic peaks at 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

XRPD analysis of Form 2 of Compound 1 showed Form 2 to be crystalline with characteristic peaks at 3.8° 2-Theta, 5.6° 2-Theta, 6.4° 2-Theta, 7.1° 2-Theta, 8.8° 2-Theta, 9.9° 2-Theta, 11.9° 2-Theta, and 14.8° 2-Theta.

XRPD analysis of Form 3 of Compound 1 showed Form 3 to be crystalline with characteristic peaks at 7.9° 2-Theta, 9.5° 2-Theta, 11.0° 2-Theta, 15.7° 2-Theta, 16.5° 2-Theta, 18.0° 2-Theta, 19.0° 2-Theta, and 21.9° 2-Theta.

XRPD analysis of Form 4 of Compound 1 showed Form 4 to be crystalline with characteristic peaks at 8.1° 2-Theta, 9.4° 2-Theta, 10.8° 2-Theta, 13.5° 2-Theta, 15.7° 2-Theta, 16.3° 2-Theta, 17.5° 2-Theta, 18.3° 2-Theta, 18.7° 2-Theta, 20.1° 2-Theta, 21.6° 2-Theta, and 21.8° 2-Theta, 25.2° 2-Theta, and 25.7° 2-Theta.

XRPD analysis of Form 5 of Compound 1 showed Form 5 to be crystalline with characteristic peaks at 7.9° 2-Theta, 8.5° 2-Theta, 9.6° 2-Theta, 11.1° 2-Theta, 15.8° 2-Theta, 16.9° 2-Theta, 18.4° 2-Theta, 19.1° 2-Theta, 22.1° 2-Theta, and 25.5° 2-Theta, and 27.4° 2-Theta.

Example 2: Differential Scanning Calorimetry (DSC)

DSC studies were performed using a TA Discovery Q2000 or DSC250. The sample was weighed in crimped aluminum pan and the accurate amount was recorded. The sample was heated from room temperature or 30° C. to 250° C. or 300° C. at a heating rate of 10° C./min with nitrogen purge.

DSC analysis of Form 1 of Compound 1 (FIG. 2) showed an endotherm with onset at about 136° C. DSC analysis of Form 1 of Compound 1 (FIG. 2) showed an endotherm with a peak at about 149° C.

DSC analysis of Form 3 of Compound 1 showed an endotherm with onset at about 117° C. and/or a peak at about 135° C.

DSC analysis of Form 4 of Compound 1 showed an endotherm having an onset at about 45° C. and a peak at about 75° C., and an endotherm having an onset at about 127° C. and a peak at about 138° C.

DSC analysis of Form 5 of Compound 1 showed a melting endotherm with onset at about 122° C. and a peak at about 132° C.

Example 3: Thermogravimetric Analysis/Dynamic Vapor Sorption

Thermogravimetric analysis of solid was performed using TA Q5000IR. The sample was placed in an open platinum pan, the amount was weighed automatically. The sample was heated from 30° C. to 300° C. at a heating rate of 10° C./min.

TGA of Form 1 of Compound 1 (FIG. 3) showed about 0.6% weight loss over the range of about 29° C. to about 150° C.

TGA of Form 3 of Compound 1 showed about 1.33% weight loss over the range of about 29° C. to about 150° C.

Dynamic vapor sorption testing was performed at 25° C., with 10-15 mg of sample, under $N_2$ at a flow rate of 200 mL/min, and drying at 0% relative humidity for 120 min.

DVS of Form 5 of Compound 1 was obtained. Compound 1, Form 5, contained less than 0.1%, or about 0.05%, residual EtOH, and KF analysis showed residual water content of about 0.5%.

II. Polymorph Synthesis

Example 4: Preparations of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile (Compound 1), Form 1

Crystallization processes for producing Compound 1, Form 1, generally produced material with needle-like morphology, which resulted in poor bulk properties that impacted preparation of pharmaceutical compositions (e.g., flow, mobility in processing bulk material). Several approaches were investigated to improve the bulk properties, including modification of a MEK/IPA crystallization process, evaluation of alternative solvent systems, pH swing experiments, and spherical agglomeration analysis. Initial experiments to improve the bulk properties by adjusting the conditions of the MEK/IPA crystallization process did not significantly improve the properties. Solvent screening failed to deliver Form 1 material with bulk properties suitable for large-scale preparation, and pH swing experiments did not provide crystalline solid. Spherical agglomerations were prepared in a water/MEK system, but produced material with mixed properties (agglomeration and needle-like), included high levels of residual solvents, and poor flow properties, and the bulk properties worsened after de-lumping by sieve. Wet milling during MEK/IPA crystallization was investigated at various temperatures and conditions. After cooling to about 10° C. in MEK/IPA, the mobility of the suspension was low and precluded wet milling, necessitating implementation of this procedure at elevated temperature and with higher amounts of IPA. Wet milling at 40° C. followed by cooling to 5° C. produced a poor mobility suspension and ultimately material with needle-like morphology, perhaps due to low proportions of solid available at 40° C. for wet milling. Wet milling after warming to 40° C. and holding for 21 h, followed by cooling to 5° C., provided a suspension with improved mobility. In additional experiments, two phases of wet milling were performed, one at 40° C. and a second at 25° C. Thermal cycling did not improve bulk properties of the solid product.

Preparation A: Amorphous Compound 1 (prepared as described in U.S. Pat. No. 10,781,218, which is herein incorporated by reference in its entirety) was dissolved in 1:1 MEK/IPA v/v (4.5 mL/g) at ~50-65° C. under $N_2$. The solution was cooled to 33-37° C. Seed crystals were added (0.8-1.2 wt % relative to Compound 1) and the mixture was stirred for 4-6 h at 33-37° C. The mixture was cooled to 23-27° C. over 3-4 hours and stirred for 16-24 hours. Isopropanol (8.6-9.1 mL/g Compound 1) was added at 23-27° C. over 9-11 hours and then the mixture was stirred for 5-6 hours. The mixture was cooled to 3-8° C. over 4-6 hours and stirred for at least 24 hours. The resulting solid precipitate was collected at 5° C. The filter cake was rinsed with IPA (1.8-2.1 mL/g Compound 1) at 3-8° C. and dried under vacuum at 45-55° C. for 24-32 hours. XRPD analysis confirmed the isolated material as crystalline Compound 1, Form 1. Purity of 99.5% by HPLC and total residual solvents was about 0.4% wt by $^1$H NMR. Recrystallization of Compound 1, Form 1, in MEK/IPA (6 v/12 v) by dissolving in MEK and adding IPA in portions at 25° C., stirring the suspension after addition of each IPA portion, cooling to 5° C., and stirring at 5° C. for 20 h produced a wet cake that was a mixture of two crystalline forms (Form 2 and Form 5) that were not Form 1. Under other recrystallization conditions, the resulting crystalline material has a low bulk density, small particle size, and needle-like morphology, leading to poor flowability and processability in preparing formulations. It was discovered that recrystallization from MEK/IPA at elevated temperatures produced Form 1. In this procedure, Compound 1 is dissolved in 2.5 v MEK, warmed to 40° C., and treated with 17.5 v IPA in portions. Following crystallization, the material is filtered at 25° C. to provide Form 1; however, upon standing, the material converted to Form 5. When performed at 50° C., the procedure produced Form 1 material (99.5% purity) but material still was characterized by needle-like morphology. Extensive evaluation of other solvent systems, reversing addition of the solvents, other anti-solvents, and pH swing conditions did not provide material with improved morphology or suitable bulk properties. Including wet milling into the MEK/IPA crystallization process increased the bulk density from approximately less than 0.1 g/cm$^3$, such as 0.07 or 0.08 g/cm$^3$, to at least 0.1 g/cm$^3$, or from about 0.1 to about 0.15 g/cm$^3$, or about 0.11, 0.12, 0.13, 0.14, or 0.15 g/cm$^3$. Wet milling also improved the mobility of the suspension in the reaction vessel, which simplified filtration during manufacturing. In this process, Compound 1 is diluted in MEK/IPA and heated to 40° C. for 21 h, without temperature cycling, producing Form 1 material with improved bulk properties (bulk density of 0.12 g/mL). Use of micronized seed crystals also helped to improve the particle size distribution (reducing from $D_{90}$ 29.7 μm to 4.1 μm), which led to an improvement in bulk density (from 0.08 to 0.17 g/mL) and Hausner ratio (from 2.0 to 1.8). In some aspects, the crystalline Compound 1, Form 1, had a particle size distribution (as measured by light diffraction measurement per USP <429>) of: $D_{10}$, 1.5 to 4.5 μm, or about 2.0 to 4.0 μm, or about 3.8 to 3.9 μm; $D_{50}$, 5 to 11 μm, or about or about 9.5 to 10.5 μm; or $D_{90}$, 13 to 50 μm, or about 33 to 45 μm.

Preparation B: Amorphous Compound 1 (1.8 g) was stirred in 30 mL toluene to form a clear solution, which was seeded with 6 mg of Compound 1, Form 1. The resulting mixture was stirred for 1 day to obtain a turbid suspension. The resulting solid was collected by filtration, washed with IPA (50 mL), and vacuum-dried at 30° C. overnight to provide Compound 1, Form 1 (1.56 g). Purity was confirmed by $^1$H NMR, HPLC, and XRPD.

Preparation C: Amorphous Compound 1 was diluted with MEK/IPA (2 vol/5 vol ratio; 5.5 vol) and the resulting mixture was heated to 65-75° C. and stirred for 0.5 to 3 h until all solids dissolved and a clear solution was obtained. The solution was polish-filtered into a pre-heated 65 to 75° C. vessel and was stirred for 0.5 to 3 h, then was cooled to 55 to 65° C. over 0.5 to 1 h, and was treated with a slurry of seed crystals (0.004-0.006 wt %) in IPA (0.01-0.06 vol). The resulting mixture was stirred at 55 to 65° C. for 1 to 2 h, then cooled to 40 to 50° C. over 1 to 2 h, and stirred for 12 to 20 h. The mixture was heated to 50 to 60° C. over 1 to 2 h and stirred for 1 to 16 h. The resulting slurry was wet milled at 50 to 60° C. Filtered IPA (7.2-8.2 vol) was added at 50 to 60° C. over 8 to 12 h, and the resulting mixture was cooled to 0 to 10° C. over 4 to 6 h, then stirred at 0 to 10° C. for 16 to 24 h. The suspension was filtered at 0 to 10° C. and the filter cake was washed twice with cold IPA (2 vol). The wet cake was dried under vacuum at 45 to 55° C. and the dry product was optionally sieved. Yield, 90%. Form 1 was confirmed by XRPD analysis.

III. Pharmaceutical Compositions

Example 5: Composition and Preparation of Capsule Composition

Compound 1 drug substance may have a low bulk density, small particle size, and needle-like morphology, all leading to poor flowability. Dry granulation using roller compaction was improved the powder flow and bulk density characteristics to enable capsule-filling. In addition, while glidants such as talc and colloidal silicon dioxide were not effective in improving powder flow and bulk density characteristics, mannitol and microcrystalline cellulose fillers improved the blend flow in the roller compactor. Formulations exhibited good stability and excipient compatibility, and rapid dissolution suitable for an immediate release drug product.

Exemplary capsule formulations include the following amounts of Compound 1 and excipients shown in Table 5.

TABLE 5

| Component | % w/w | % w/w | % w/w |
|---|---|---|---|
| Compound 1 | 15.75 (25.0 mg) | 35.0 (50.0 mg) | 35.0 (200.0 mg) |
| Mannitol (filler) | 68.05 | 29.0 | 29.0 |

TABLE 5-continued

| Component | % w/w | % w/w | % w/w |
|---|---|---|---|
| Microcrystalline Cellulose (filler) | 13.05 | 29.0 | 29.0 |
| Croscarmellose Sodium (disintegrant) | 2.70 | 6.0 | 6.0 |
| Sodium Lauryl Sulfate (surfactant) | 0.225 | 0.5 | 0.5 |
| Magnesium Stearate (lubricant) | 0.225 | 0.5 | 0.5 |
| Total | 100.0 | 100.0 | 100.0 |

Method A: Compound 1, microcrystalline cellulose, croscarmellose sodium, and sodium lauryl sulfate are blended. Mannitol is added followed by magnesium stearate. The resulting lubricated blend is fed into a roller compactor for dry granulation. The generated ribbons are milled using a screen to create granules. For the 25.0 mg strength capsules, the % w/w amounts shown for the excipients in the 50.0 mg column are used to make granules, and the resulting granules are mixed with mannitol to arrive at the % w/w amounts shown in the 25.0 mg column. Resulting granules for each strength are loaded into capsule shells.

Method B: Compound 1 is mixed with a mixture of microcrystalline cellulose, mannitol, croscarmellose sodium, and sodium lauryl sulfate, and the resulting blend is milled and then blended with 50% of the magnesium stearate. The resulting lubricated blend is fed into a roller compactor for dry granulation. The generated ribbons are milled to generate granules. The granules are mixed with the remaining 50% of magnesium stearate and the resulting mixture is encapsulated.

Capsule formulations may comprise Compound 1 as Form 1 or an amorphous form. Compound 1 may be used in an amount of about 15 to 800 mg. Mannitol may be used in a % w/w range of about 15 to 75, or about 25 to 35, or about 25 to 30, or about 28 to 32, or about 65 to 70, or about 29% w/w or about 68% w/w. Microcrystalline cellulose may be used in a % w/w range of about 10 to 35, or about 10 to 15, or about 25 to 35, or about 25 to 30, or about 28 to 32, or about 13% or about 29%. Croscarmellose sodium may be used in a % w/w range of about 1 to 10, or about 3 to 10, or about 1 to 8, or about 4 to 8, or about 3% w/w, or about 6% w/w. Sodium lauryl sulfate may be used in a % w/w range of about 0.1 to 1.0, or about 0.2 to 0.8, or about 0.4 to 0.6, or about 0.2, or about 0.5. Magnesium stearate may be used in a % w/w range of about 0.1 to 1.0, or about 0.2 to 0.8, or about 0.4 to 0.6, or about 0.2%, or about 0.5.

Example 6: Compositions and Preparation of Tablet Compositions

Excipient compatibility studies for tablet formulations indicated an impact to Compound 1 stability with certain excipients, such as mannitol, povidone, hydroxypropyl methylcellulose, and Opadry HPMC, for which use could require special precautions, particularly in tablet settings. In particular, these studies indicated less risk of instability in the presence of lactose as a diluent compared to mannitol.

Components of exemplary tablet compositions are provided in Table 6 (A) and Table 7 (B).

TABLE 6

Composition (A).

| Component | mg/Tablet | % w/w |
|---|---|---|
| Intragranular | | |
| Compound 1 | 400 | 50.0 |
| Microcrystalline cellulose (filler) | 232 | 29.0 |
| Lactose anhydrous (filler) | 68 | 8.5 |
| Hydroxypropylcellulose (binder) | 40 | 5.0 |
| Croscarmellose sodium (disintegrant) | 24 | 3.0 |
| Sodium lauryl sulfate (surfactant) | 8 | 1.0 |
| Extragranular | | |
| Croscarmellose sodium (distintegrant) | 16 | 2.0 |
| Magnesium stearate (lubricant) | 8 | 1.0 |
| Colloidal silicon dioxide (glidant) | 4 | 0.5 |
| Total (before coating) | 800 | 100.0 |
| Coating: Opadry II orange | 24 | 3.0 |

Abbreviations: % w/w = percent weight/weight.

Intragranular components, including Compound 1 (such as Compound 1, Form 1) were screened and then mixed for 1 min to provide a dry blend in a PMA-1 high shear granulator. Water (400 g for 1 kg batch) was sprayed at a rate of 100 g/min for 4 min at an impeller speed of 350 rpm and a chopper speed of 2200 rpm. Optionally, an additional portion of water (50 g) was sprayed for 30 sec under the same conditions. Alternatively, the hydroxypropylcellulose was dissolved in water and sprayed into the blend during granule formation. The resulting wet granules were screened through a Quadro Comil 197S equipped with a 250Q screen. The resulting granules were dried in an S-1 fluid bed dryer and then dry milled by screening through a 062R screen. The dried, milled granules were blended with colloidal silicon dioxide and croscarmellose sodium and the resulting mixture was blended with magnesium stearate. The resulting blend was compressed on a Korsch XM-12 equipped with D-tooling to a target tablet weight of 800 mg (for 400 mg Compound 1). The resulting tablets were coated. For the final blends from the compositions in Table 6, bulk density was 0.48-0.52 g/mL, tapped density was 0.6-0.65 g/mL, and the Hausner Ratio was 1.25-1.28, with passable flow. Dissolution testing showed 82% dissolution at 10 min 93-95% at 20 min, 97% at 30 min, and 99% at 60 min.

TABLE 7

Composition (B).

| Component | mg/Tablet | mg/Tablet | % w/w |
|---|---|---|---|
| Intragranular | | | |
| Compound 1 | 200 | 500 | 66.7 |
| Microcrystalline cellulose | 37.0 | 92.5 | 12.3 |
| Lactose anhydrous | 28.5 | 71.2 | 9.5 |

TABLE 7-continued

Composition (B).

| Component | mg/Tablet | mg/Tablet | % w/w |
|---|---|---|---|
| Hydroxypropylcellulose | 12 | 30 | 4.0 |
| Croscarmellose sodium | 9 | 22.5 | 3.0 |
| Sodium lauryl sulfate | 3 | 7.5 | 1.0 |
| Extragranular | | | |
| Croscarmellose sodium | 6 | 15 | 2.0 |
| Magnesium stearate | 3 | 7.5 | 1.0 |
| Colloidal silicon dioxide | 1.5 | 3.8 | 0.5 |
| Total (before coating) | 300 | 750 | 100.0 |
| Coating: Opadry II orange | 9 | 22.5 | 3.0 |

Abbreviations: % w/w = percent weight/weight.

Intragranular components, including Compound 1 (such as Compound 1, Form 1), were screened and then mixed to form a pre-blend, which was wet granulated to form granules, which were screened (#8 mesh), dried, and screened (#30 mesh) to form dry granules. The dry granules were blended with the extragranular ingredients and compressed into 200 mg and 500 mg tablets, which were coated. Target hardness range for tablets was 10 to 25 kp (e.g., 12 kp for 200 mg tablets and 20 kp for 500 mg tablets).

Additional exemplary tablet compositions (C), (D), and (E) are provided in Table 8.

TABLE 8

| Component | (C) % w/w | (D) % w/w | (E) % w/w |
|---|---|---|---|
| Intragranular | | | |
| Compound 1 | 66.7 | 66.7 | 66.7 |
| Microcrystalline cellulose | 9.3 | 9.3 | 9.3 |
| Lactose anhydrous | 10.0 | 10.0 | |
| Mannitol | | | 10.0 |
| Hydroxypropylcellulose | 3.0 | 3.0 | 3.0 |
| Croscarmellose sodium | 2.0 | | 2.0 |
| Crospovidone | | 2.0 | |
| Sodium lauryl sulfate | 1.0 | 1.0 | 1.0 |
| Extragranular | | | |
| Microcrystalline cellulose | 5.0 | 5.0 | 5.0 |
| Croscarmellose sodium | 2.0 | | 2.0 |
| Crospovidone | | 2.0 | |
| Magnesium stearate | 1.0 | 1.0 | 1.0 |
| Total (before coating) | 100.0 | | |

Intragranular ingredients were mixed to form a pre-blend, which was wet-granulated with 25-30% water to form wet granules. The wet granules were screened through #4 mesh, dried, screened through #30 mesh, mixed with extra-granular ingredients, and compressed into tablets in 200 mg and 500 mg strengths. Bulk density of the final blends ranged from 0.12 (E) to 0.18 (D) g/mL, tapped density ranged from 0.26 (E) to 0.34 (D) g/mL, Carr's Index ranged from 46 (D) to 56% (E), and Hausner Ratio ranged from 1.85 (D) to 2.30 (E). Disintegration times for tablets pressed at 2500 N: (C), 14 sec; (D), 20 sec; (E) 32 sec. Disintegration times for tablets pressed at 6000 N: (C), 32 sec; (D), 31 sec; (E) 29 sec. Adjustments were made to increase bulk density by using higher bulk density ingredients, such as microcrystalline cellulose (e.g., 0.43 vs. 0.32 g/mL) and lactose (0.72 vs. 0.59 g/mL), removing microcrystalline cellulose from extra-granular portion and adding to intragranular portion, increasing binder component, removing mannitol, and adding colloidal silicon dioxide to the extragranular portion.

Exemplary composition (F) is shown in Table 9.

TABLE 9

| Component | (F) % w/w |
|---|---|
| Intragranular | |
| Compound 1 | 66.7 |
| Microcrystalline cellulose | 13.3 |
| Lactose anhydrous | 10.0 |
| Hydroxypropylcellulose | 4.0 |
| Croscarmellose sodium | 2.0 |
| Sodium lauryl sulfate | 1.0 |
| Extragranular | |
| Croscarmellose sodium | 2.0 |
| Magnesium stearate | 1.0 |
| Total (before coating) | 100.0 |

The intragranular components were blended and wet granulated using a Key High Shear Granulator at water addition levels ranging from 40 to 60%. Bulk density of wet granules by water addition was: 40%, 0.34 g/cc; 45%, 0.38 g/cc; 50%, 0.47 g/cc; 55%, 0.52 g/cc; 60%, 0.59 g/cc. Granules were screened through a #4 mesh screen, screened granules were dried, and dried granules were screened using a #20 mesh screen. The dried granules were mixed with extragranular components to form the final blend (for 50% water example, bulk density, 0.12 g/mL, tap density, 0.26 g/mL, Carr's Index, 56.5, Hausner Ratio, 2.30) and the final blend compressed into 200 and 500 mg strength tablets at 3000 N and 7500 N force, respectively. Dissolution (0.01 N HCl/0.5% Tween 80): 200 mg tablets (50% water preparation), 98% at 10 min and 100% at 20 min; 500 mg tablets (50% water preparation), 98% at 10 min, 100% at 20 min; 500 mg tablets (60% water preparation), 93% at 10 min, 99% at 20 min, 100% at 30 min. Although 60% water preparation increased bulk density to 0.59 g/mL, the material had an over-granulated appearance. In some aspects, for 500 mg tablets, the disintegrant amount is reduced by 1% w/w.

Exemplary composition (G) is shown in Table 10.

TABLE 10

| Component | (G) % w/w |
|---|---|
| Intragranular | |
| Compound 1 | 66.7 |
| Microcrystalline cellulose | 12.3 |
| Lactose anhydrous | 10.0 |
| Hydroxypropylcellulose | 4.0 |
| Croscarmellose sodium | 3.0 |
| Sodium lauryl sulfate | 1.0 |
| Extragranular | |
| Croscarmellose sodium | 2.0 |
| Magnesium stearate | 1.0 |
| Total (before coating) | 100.0 |

Intragranular components were blended (bulk density 0.13 g/mL, tap density 0.33 g/mL, Hausner's Ratio, 2.54), then wet granulated with 50% water, screened (#8 mesh), dried (bulk density 0.30 g/mL, tap density 0.41 g/mL, Hausner's Ratio 1.37), screened (#30 mesh), blended with extragranular excipients (bulk density 0.33 g/mL, tap density 0.44 g/mL, Hausner's Ratio 1.33; passable flow), and compressed into 200 and 500 mg tablet strengths (good compressibility), and then coated with Opadry II. Dissolution profile for 200 mg tablets: 10 min, 93%; 30 min, 97%, 90 min, 99.2%. Dissolution profile for 500 mg tablets: 10 min, 91%; 30 min, 94%; 90 min, 98%. To improve the flow of the blend, colloidal silicon dioxide was added as a glidant in the extragranular portion, as shown in the exemplary composition provided in Table 7.

Exemplary compositions (H), (I), and (J) with 50% Compound 1 loading are shown in Table 11.

TABLE 11

| Component | (H) % w/w | (I) % w/w | (J) % w/w |
|---|---|---|---|
| Intragranular | | | |
| Compound 1 | 50.0 | 50.0 | 50.0 |
| Microcrystalline cellulose | 30.0 | 30.0 | 29.0 |
| Lactose anhydrous | 8.5 | 8.5 | 8.5 |
| Hydroxypropylcellulose | 4.0 | 4.0 | 5.0 |
| Croscarmellose sodium | 3.0 | 3.0 | 3.0 |
| Sodium lauryl sulfate | 1.0 | 1.0 | 1.0 |
| Extragranular | | | |
| Croscarmellose sodium | 2.0 | 2.0 | 2.0 |
| Magnesium stearate | 0.75 | 1.0 | 0.75 |
| Colloidal silicon dioxide | 0.5 | 0.5 | 0.5 |
| Microcrystalline cellulose | 0.25 | | 0.25 |
| Total (before coating) | | | |

Intragranular components were blended, with addition of hydroxypropylcellulose as a dry material with water spray or with hydroxypropylcellulose dissolved in water for spraying. The blend was wet granulated, the wet granules screened through a Quadro Comil 197S with a 250Q screen, and the resulting granules dried. Dry granules were screened through 062R screen and blended with croscarmellose sodium and colloidal silicon dioxide, and the resulting mixture was then blended with magnesium stearate. Final blend data: bulk density, 0.43-0.45 g/mL; tap density, 0.56-0.57 g/mL; Compressibility Index, 21-23%; flow character, passable. The final blends were compressed into tablets at 200, 300, or 400 mg strengths and coated with Opadry II. Dissolution profiles for (A) (5% HPC; 1% magnesium stearate) were similar to (H) and (I) (4% HPC; 0.75 vs. 1.0% magnesium stearate) and to (J) (4% HPC; 0.75% magnesium stearate), and (A) and (J) were similar (differing in amount of water used during granulation, 43% vs. 48). Dissolution for 200, 300, and 400 mg tablets: 10 min, 66-79%; 20 min, 85-93%; 30 min, 92-97%; 60 min, 95-99%.

IV. Biological Data

Example 7: Fluorescence Polarization Assay

Fluorescence polarization (FP) competition experiments were performed to determine the effectiveness with which Compound 1 inhibits the menin-MLL interaction, reported as an $IC_{50}$ value. A fluorescein-labeled peptide containing the high affinity menin binding motif found in MLL was produced according to Yokoyama et al. (Cell, 2005, 123(2): 207-218). Binding of the labeled peptide (1.7 kDa) to the much larger menin (~67 kDa) is accompanied by a significant change in the rotational correlation time of the fluorophore, resulting in a substantial increase in the fluorescence polarization and fluorescence anisotropy (excitation at 500 nm, emission at 525 nm). The effectiveness with which Compound 1 inhibits the menin-MLL interaction was measured in an FP competition experiment, wherein a decrease in fluorescence anisotropy correlates with inhibition of the interaction and was used as a read-out for $IC_{50}$ determination: Compound 1, $IC_{50}$ (half-maximal inhibitory concentration)<50 nM.

We claim:
1. A pharmaceutical composition comprising wet-milled crystalline of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof having a bulk density of at least 0.1 g/cm$^3$.

2. The pharmaceutical composition of claim 1, wherein the wet-milled crystalline form of (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile Form 1 having an XRPD pattern with at least three characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

3. The pharmaceutical composition of claim 1, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile Form 1 having an X-ray powder diffraction (XRPD) pattern with at least five characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

4. The pharmaceutical composition of claim 1, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile Form 1 having a differential scanning calorimetry (DSC) thermogram with an endotherm having an onset at about 136° C. and/or a peak at about 149° C.

5. The pharmaceutical composition of claim 1, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is obtained from methyl ethyl ketone (MEK) and isopropanol (IPA).

6. The pharmaceutical composition of claim 5, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is obtained from a 1:1 mixture of MEK and IPA.

7. The pharmaceutical composition of claim 1, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof has a bulk density from about 0.1 to about 0.15 g/cm$^3$.

8. The pharmaceutical composition of claim 1, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof has a particle size distribution of $D_{10}$, 1.5 to 4.5 μm; $D_{50}$, 5 to 11 μm; or $D_{90}$, 13 to 50 μm; or a particle size distribution of $D_{90}$ equal to or below 50 μm.

9. The pharmaceutical composition of claim 1, comprising 15 to 800 mg of the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof.

10. The pharmaceutical composition of claim 1, comprising a pharmaceutically acceptable excipient.

11. The pharmaceutical composition of claim 10, wherein the pharmaceutically acceptable excipient is selected from a filler, a disintegrant, a surfactant, and a lubricant, and combinations thereof, optionally wherein the filler is mannitol and/or microcrystalline cellulose, optionally wherein the disintegrant is croscarmellose sodium, optionally wherein the surfactant is sodium lauryl sulfate, and optionally wherein the lubricant is magnesium stearate.

12. The pharmaceutical composition of claim 10, wherein the pharmaceutically acceptable excipient is selected from a filler, a binder, a disintegrant, a surfactant, a glidant, and a lubricant, and combinations thereof, optionally where in the filler is microcrystalline cellulose, lactose, or mannitol, or a combination thereof, optionally wherein the binder is hydroxypropyl cellulose, optionally wherein the disintegrant is croscarmellose sodium or crospovidone, optionally wherein the surfactant is sodium lauryl sulfate, optionally wherein the glidant is colloidal silicon dioxide, and optionally wherein the lubricant is magnesium stearate.

13. The pharmaceutical composition of claim 10, wherein the pharmaceutical composition is a capsule.

14. The pharmaceutical composition of claim 13, wherein the capsule comprises:
a) 15 to 800 mg of the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof;
b) 15% w/w to 75% w/w of a first filler, optionally wherein the first filler is mannitol;
c) 10% w/w to 35% w/w of a second filler, optionally wherein the second filler is microcrystalline cellulose;
d) 1% w/w to 10% w/w of a disintegrant, optionally wherein the disintegrant is croscarmellose sodium;
e) 0.1% w/w to 1% w/w of a surfactant, optionally wherein the surfactant is sodium lauryl sulfate; and
f) 0.1% w/w to 1% w/w of a lubricant, optionally wherein the lubricant is magnesium stearate;
wherein the total % w/w of a) to f) is 100%.

15. The pharmaceutical composition of claim 10, wherein the pharmaceutical composition is a tablet.

16. The pharmaceutical composition of claim 15, wherein the tablet comprises:
a) 35% w/w to 75% w/w of the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof;
b) 7% w/w to 40% w/w of a first filler, optionally wherein the first filler is microcrystalline cellulose;
c) 5% w/w to 25% w/w of a second filler, optionally wherein the second filler is lactose anhydrous or mannitol;
d) 2% w/w to 10% w/w of a binder; optionally wherein the binder is hydroxypropyl cellulose;
e) 1% w/w to 10% w/w of a disintegrant, optionally wherein the disintegrant is croscarmellose sodium or crospovidone;
f) 0.3% w/w to 2% w/w of a surfactant, optionally wherein the surfactant is sodium lauryl sulfate;
g) 0.3% w/w to 2% w/w of a lubricant, optionally wherein the lubricant is magnesium stearate; and
h) 0.1% w/w to 1% w/w of a glidant, optionally wherein the glidant is colloidal silicon dioxide;
wherein the total % w/w of a) to h) is 100%.

17. A pharmaceutical composition comprising about 100 mg to about 500 mg of wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile free base anhydrate.

18. The pharmaceutical composition of claim 17, comprising about 200 mg or about 300 mg of the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile free base anhydrate.

19. The pharmaceutical composition of claim 17, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile free base anhydrate has an XRPD pattern with at least three characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

20. The pharmaceutical composition of claim 19, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile free base anhydrate is obtained from a mixture of methyl ethyl ketone (MEK) and isopropanol (IPA).

21. The pharmaceutical composition of claim 20, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile free base anhydrate is obtained from a 1:1 mixture of MEK and IPA.

22. The pharmaceutical composition of claim 1, comprising the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof without other therapeutic agents.

23. A pharmaceutical composition comprising wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof.

24. The pharmaceutical composition of claim 23, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile Form 1 having an XRPD pattern with at least three characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

25. The pharmaceutical composition of claim 23, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile Form 1 having an X-ray powder diffraction (XRPD) pattern with at least five characteristic peaks selected from 4.1° 2-Theta, 5.4° 2-Theta, 6.6° 2-Theta, 8.2° 2-Theta, 9.5° 2-Theta, 12.3° 2-Theta, 13.1° 2-Theta, 13.9° 2-Theta, 15.9° 2-Theta, 16.4° 2-Theta, 17.0° 2-Theta, 17.5° 2-Theta, 19.7° 2-Theta, and 22.6° 2-Theta.

26. The pharmaceutical composition of claim 23, wherein the pharmaceutical composition is a capsule comprising:
  a) 15 to 800 mg of wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof;
  b) 15% w/w to 75% w/w of a first filler, optionally wherein the first filler is mannitol;
  c) 10% w/w to 35% w/w of a second filler, optionally wherein the second filler is microcrystalline cellulose;
  d) 1% w/w to 10% w/w of a disintegrant, optionally wherein the disintegrant is croscarmellose sodium;
  e) 0.1% w/w to 1% w/w of a surfactant, optionally wherein the surfactant is sodium lauryl sulfate; and
  f) 0.1% w/w to 1% w/w of a lubricant, optionally wherein the lubricant is magnesium stearate;
  wherein the total % w/w of a) to f) is 100%.

27. The pharmaceutical composition of claim 23, wherein the pharmaceutical composition is a tablet comprising:
  a) 35% w/w to 75% w/w of wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof;
  b) 7% w/w to 40% w/w of a first filler, optionally wherein the first filler is microcrystalline cellulose;
  c) 5% w/w to 25% w/w of a second filler, optionally wherein the second filler is lactose anhydrous or mannitol;
  d) 2% w/w to 10% w/w of a binder; optionally wherein the binder is hydroxypropyl cellulose;
  e) 1% w/w to 10% w/w of a disintegrant, optionally wherein the disintegrant is croscarmellose sodium or crospovidone;
  f) 0.3% w/w to 2% w/w of a surfactant, optionally wherein the surfactant is sodium lauryl sulfate;
  g) 0.3% w/w to 2% w/w of a lubricant, optionally wherein the lubricant is magnesium stearate; and
  h) 0.1% w/w to 1% w/w of a glidant, optionally wherein the glidant is colloidal silicon dioxide;
  wherein the total % w/w of a) to h) is 100%.

28. The pharmaceutical composition of claim 23, wherein the wet-milled crystalline (S)-4-methyl-5-((4-((2-(methylamino)-6-(2,2,2-trifluoroethyl)thieno[2,3-d]pyrimidin-4-yl)amino)piperidin-1-yl)methyl)-1-(2-(4-(methylsulfonyl)piperazin-1-yl)propyl)-1H-indole-2-carbonitrile or solvate thereof is obtained from a mixture of methyl ethyl ketone (MEK) and isopropanol (IPA).

* * * * *